(12) United States Patent
Jain

(10) Patent No.: US 10,869,369 B2
(45) Date of Patent: Dec. 15, 2020

(54) LED CONTROL AND DRIVING CIRCUIT CAPABLE OF BOTH ANALOG AND DIGITAL DIMMING

(71) Applicant: STMicroelectronics International N.V., Schiphol (NL)

(72) Inventor: Akshat Jain, Nahan (IN)

(73) Assignee: STMicroelectronics International N.V., Schiphol (NL)

( * ) Notice: Subject to any disclaimer, the term of this patent is extended or adjusted under 35 U.S.C. 154(b) by 0 days.

(21) Appl. No.: 16/216,174

(22) Filed: Dec. 11, 2018

(65) Prior Publication Data

US 2019/0182922 A1 Jun. 13, 2019

Related U.S. Application Data

(60) Provisional application No. 62/598,084, filed on Dec. 13, 2017.

(51) Int. Cl.
| | |
|---|---|
| *H05B 45/10* | (2020.01) |
| *H05B 45/37* | (2020.01) |
| *H05B 45/355* | (2020.01) |
| *H02M 1/08* | (2006.01) |
| *H02M 1/42* | (2007.01) |

(Continued)

(52) U.S. Cl.
CPC ............ *H05B 45/10* (2020.01); *H02M 1/083* (2013.01); *H02M 1/4208* (2013.01); *H05B 45/37* (2020.01); *H05B 45/44* (2020.01); *H02M 2001/007* (2013.01); *H02M 2001/0009* (2013.01)

(58) Field of Classification Search
CPC ...... H02M 1/083; H02M 1/42; H02M 1/4208; H02M 1/425; H02M 5/10; H02M 3/1582; H02M 3/1584; H02M 2001/007; H02M 2001/0009
See application file for complete search history.

(56) References Cited

U.S. PATENT DOCUMENTS

| | | | |
|---|---|---|---|
| 2010/0026208 A1* | 2/2010 | Shteynberg | H05B 33/08 315/297 |
| 2013/0175931 A1* | 7/2013 | Sadwick | H05B 37/02 315/158 |

(Continued)

*Primary Examiner* — Wei (Victor) Y Chan
*Assistant Examiner* — Henry Luong
(74) *Attorney, Agent, or Firm* — Crowe & Dunlevy

(57) ABSTRACT

A LED driving circuit includes a power factor correction circuit receiving a rectified mains voltage and providing output to a DC voltage bus, a string of LEDs connected in series, a voltage converter receiving input from the DC voltage bus and providing output to the string of LEDs, and a microcontroller. The microcontroller receives a plurality of digital feedback signals from the voltage converter, controls the voltage converter based upon a user desired brightness level and the plurality of digital feedback signals, and receive a plurality of feedback signals from the power factor correction circuit. Based on the plurality of feedback signals, the microcontroller operates the power factor correction circuit in transition mode where the user desired brightness level is above a threshold brightness, and operates the power factor correction circuit in discontinuous mode where the user desired brightness level is below the threshold brightness.

32 Claims, 14 Drawing Sheets

(51) Int. Cl.
 *H05B 45/44* (2020.01)
 *H02M 1/00* (2006.01)

(56) References Cited

U.S. PATENT DOCUMENTS

2018/0110102 A1* 4/2018 Adams ..................... F21V 5/04
2018/0227995 A1* 8/2018 Ekbote ............... H05B 33/0815

* cited by examiner

LED CONTROL AND DRIVING CIRCUIT CAPABLE OF BOTH ANALOG AND DIGITAL DIMMING

RELATED APPLICATION

This application claim the benefit and priority of U.S. Provisional Application No. 62/598,084, entitled "LED CONTROL AND DRIVING CIRCUIT CAPABLE OF BOTH ANALOG AND DIGITAL DIMMING", filed Dec. 13, 2017, the contents of which are incorporated by reference.

TECHNICAL FIELD

This disclosure is directed to the field of light emitting diode (LED) control and driving and, in particular, to a LED driving circuit controlled by a microcontroller that operates based upon feedback parameters related to logical operations within the circuit as well as feedback parameters based upon operational conditions of the circuit itself. The LED driving circuit described herein allows for flickerless operation down to, or below, a brightness that is 0.5% of the maximum brightness.

BACKGROUND

Arrays of light emitting diodes (LEDs) are commonly used today to create light bulbs, light bars, and other lighting solutions. LED based lighting brings two principal advantages over other types of lighting, such as fluorescent based lighting and incandescent based lighting, namely lower power consumption for a given light output and a longer operating life.

However, LED based lighting is not without its drawbacks. When dimming control of LED based lighting is provided, perceptible as well as imperceptible flicker may be present in the light output by the LED based lighting. Perceptible flicker is visually bothersome and may have physiological effects on users, such as causing headaches, and is therefore undesirable. Imperceptible flicker, while not visually bothersome, still causes the same physiological effects to users.

While techniques for dimming control of LED lighting that do not produce flicker are known, the lowest brightness that can be produced using such techniques may not be as low as commercially desirable. Therefore, further development in the area of LED driving and control circuitry is needed.

SUMMARY

In an embodiment, a LED driving circuit includes: a power factor correction circuit receiving a rectified mains voltage and providing output to a DC voltage bus, a string of LEDs connected in series, a voltage converter receiving input from the DC voltage bus and providing output to the string of LEDs, and a microcontroller. The microcontroller receives a plurality of digital feedback signals from the voltage converter, controls the voltage converter based upon a user desired brightness level and the plurality of digital feedback signals, and receives a plurality of feedback signals from the power factor correction circuit. Based on the plurality of feedback signals, the microcontroller operates the power factor correction circuit in transition mode where the user desired brightness level is above a threshold brightness, and operates the power factor correction circuit in discontinuous mode where the user desired brightness level is below the threshold brightness.

The power factor correction circuit may be configured to generate its plurality of feedback signals as an input sense signal that is a function of the rectified mains voltage as drawn by the power factor correction circuit, an output sense signal that is a function of the output provided to the DC voltage bus, a zero crossing detect signal that is a function of zero crossings of an inductor current in the power factor correction circuit, and a peak current detect signal generated based upon instances of the inductor current exceeding a threshold current.

The power factor correction circuit may include an input node receiving the rectified mains voltage, a transformer having a first winding coupled between the input node and a first node, a diode coupled between the first node and the DC voltage bus, a first voltage divider coupled between the DC voltage bus and ground, and a center tap of the first voltage divider providing the output sense signal. The transformer may have a second winding coupled between a second node and ground, the second winding being electromagnetically coupled to the first winding. A filter may be coupled between the second node and a third node. A comparator may have a first input coupled to the third node, a second input coupled to a reference voltage, and an output providing the zero crossing detect signal. A second voltage divider may be coupled between the input node and ground, with a center tap of the second voltage divider providing the input sense signal. A peak current detect signal generation circuit may be coupled to receive input from the first node.

The peak current detect signal generation circuit may include a gate driver receiving as input a power factor correction gate drive signal from the microcontroller and providing a control signal output, a transistor coupled between the first node and a fourth node, with the transistor biased by the control signal output, and a comparator having a first input coupled to the fourth node, a second input coupled to receive a second reference voltage, and an output generating the peak current detect signal.

The voltage converter may include a power transistor coupled between the DC voltage bus and a first node, and a voltage divider coupled between the first node and ground. A buck zero cross detect signal may be generated at a center tap of the voltage divider. An inductor may be coupled between the first node and a second node, a capacitor may be coupled between the second node and a third node, and a filter may be coupled to the third node. The string of LEDs may be coupled between the second node and the third node, a buck current peak comparison signal may be generated at the third node, a buck current sense signal may be generated at an output of the filter, and the plurality of digital feedback signals may include the buck zero cross detect signal, the buck current peak comparison signal, and the buck current sense signal.

A first diode may be coupled between the first node and ground, a second diode may be coupled between the center tap of the voltage divider and a voltage reference, and a third diode may be coupled between the center tap of the voltage divider and ground.

A gate driver may receive as input a buck drive enable signal and a buck gate drive signal from the microcontroller, and may bias the power transistor based thereupon.

The microcontroller may include a system control block receiving the user desired brightness level, receiving the plurality of digital feedback signals from the voltage converter, and receiving the plurality of feedback signals from the power factor correction circuit. A voltage converter pulse width modulation circuit may be controlled by the system control block, operate based upon at least some of the plurality of digital feedback signals from the voltage converter, and generate a gate drive signal for the voltage converter. A power factor converter pulse width modulation circuit may be controlled by the system control block, operate based upon some of plurality of feedback signals from the power factor correction circuit, and generate a gate drive signal for the power factor correction circuit.

The voltage converter may be configured to generate the plurality of digital feedback signals as at least a zero cross detect signal, and the voltage converter pulse width modulation circuit may generate the gate drive signal for the voltage converter by performing steps of: (a) in response to assertion of the zero cross detect signal, cause a timer to begin counting, (b) when the timer reaches a given value, assert the gate drive signal, (c) deassert the gate drive signal when an inductor current in the voltage converter reaches a set threshold, (d) stop counting of the timer when the timer reaches an automatic reset value, (e) reset the timer to zero without causing the timer to again begin counting, and (f) when the zero cross detect signal is again asserted, return to (a).

The power factor correction circuit may be configured to generate its plurality of feedback signals as at least a zero crossing detect signal that is a function of zero crossings of the inductor current in the power factor correction circuit, and the power factor converter pulse width modulation circuit may be configured to generate the gate drive signal for the power factor correction circuit by performing steps of: (a) in response to assertion of the zero crossing detect signal, cause a timer to begin counting, (b) when the timer reaches a given value, assert the gate drive signal, (c) deassert the gate drive signal when the timer counter reaches an automatic reset value or when the inductor current crosses the set threshold, whichever occurs first, and (d) reset the timer to zero without causing the timer to again begin counting, and (e) when the zero crossing detect signal is again asserted, return to (a).

The voltage converter may include a diode coupled between a first node and the DC voltage bus, a power transistor coupled between the first node and a second node, a sense resistor coupled between the second node and ground, a voltage divider coupled between the first node and ground, an inductor coupled between the first node and a third node, and a filter coupled between the second node and a fourth node. An inverse buck zero cross detect signal is generated at a center tap of the filter, an inverse buck current peak comparison signal is generated at the second node, and an inverse buck current sense signal is generated at an output of the filter. The string of LEDs may be coupled between the third node and the DC voltage bus. The plurality of digital feedback signals may include the inverse buck zero cross detect signal, the inverse buck current peak comparison signal, and the inverse buck current sense signal. A first diode may be coupled between the center tap of the voltage divider and a voltage reference, and a second diode may be coupled between the center tap of the voltage divider and ground.

A gate driver may receive as input an inverse buck drive enable signal and an inverse buck gate drive signal from the microcontroller, and bias the power transistor based thereupon.

DETAILED DESCRIPTION

Figure 1:
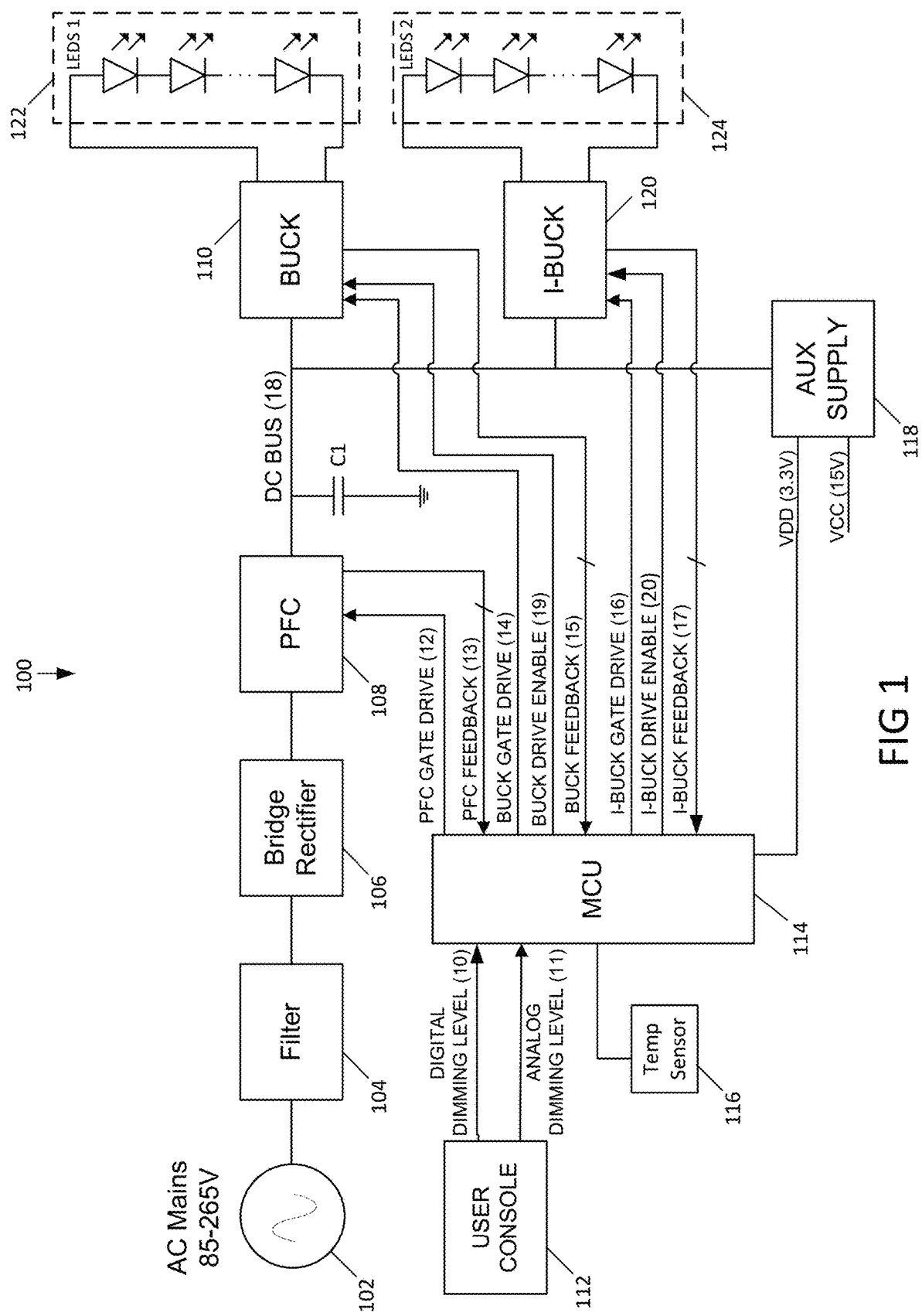
FIG. 1 is a block diagram of a LED control and driving circuit in accordance with this disclosure.

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Like reference numbers in the drawing figures refer to like elements throughout.

With initial reference to FIG. 1, a LED control and driving circuit 100 includes a low-pass filter 104 receiving input from AC voltage mains 102. A bridge rectifier 106 receives input from the low-pass filter 104, and provides output to a power factor correction (PFC) circuit 108. The power factor correction circuit 108 provides output to a DC voltage bus 18.

A buck voltage converter 110 and an inverse buck voltage converter 120 are both coupled to the DC voltage bus 18. A capacitor C1 is coupled between the DC voltage bus 18 and ground. A first string of series connected LEDs 122 is powered by the buck voltage converter 110, and a second string of series connected LEDs 124 is powered by the inverse buck voltage converter 120. An auxiliary voltage supply 118 is coupled to receive input from the DC voltage bus 18, and generates output voltages VDD and VCC based thereupon.

A microcontroller 114 is powered between VDD and ground, receives digital and analog dimming inputs 10, 11 from a user console 112 (e.g. switches, dials, etc), and receives a temperature input from a temperature sensor 116. The microcontroller 114 also receives feedback signals 13 from the power factor conversion circuit 108, feedback signals 15 from the buck voltage converter 110, and feedback signals 17 from the inverse buck voltage converter 120.

Figure 4A:
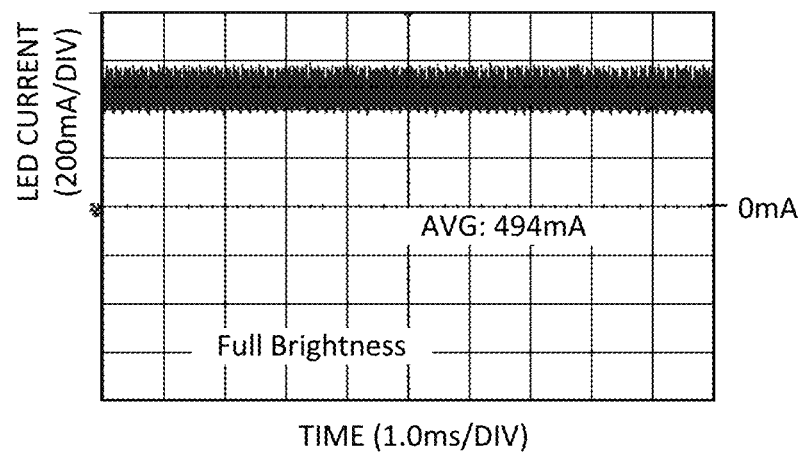
FIGS. 4A-4C are graphs of LED current vs. time showing the LED current at full brightness, the LED current at half brightness using analog dimming, and the LED current at half brightness using digital dimming.
Figure 4B:
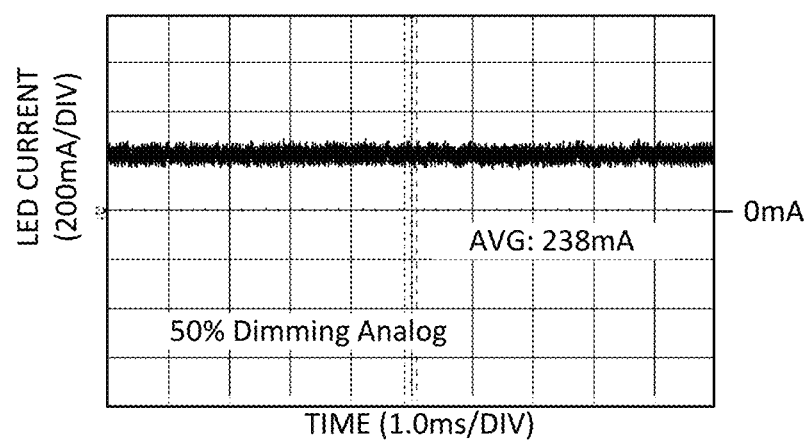
Figure 4C:
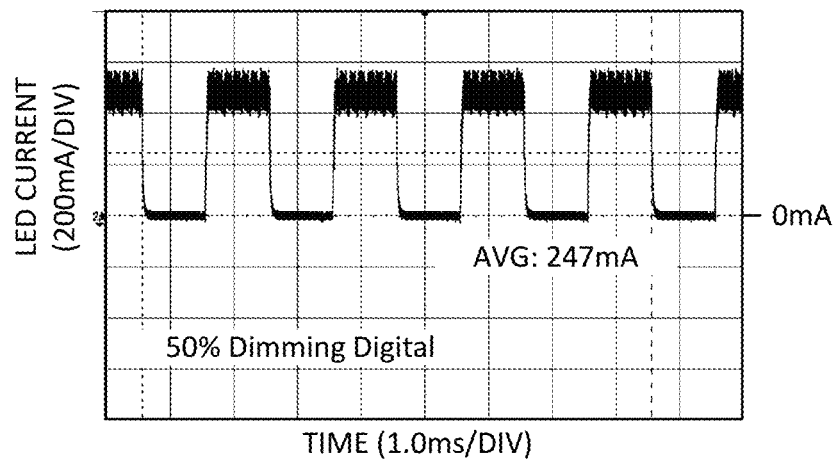

In operation, the microcontroller 114 operates to generate a gate drive signal 14 for the buck converter 110 to cause the first string of series connected LEDs 122 to illuminate at a desired dimming level, using either analog or digital dimming, in response to the digital and analog dimming inputs 10, 11. Shown in FIG. 4A is a sample current through LEDs 122 at full brightness. Shown in FIG. 4B is a sample current through LEDs 122 at 50% brightness, using analog dimming. Shown in FIG. 4C is a sample current through LEDs 122 at 50% brightness, using digital dimming. From FIGS. 4B and 4C, it can be noticed that analog dimming functions by changing the amplitude of the current, while digital dimming functions by changing the duty cycle of the current.

The gate drive signal 14 is generated based upon the feedback signals 15 received from the buck voltage converter 110. The microcontroller 114 also operates to generate a gate drive signal 16 for the inverse buck converter 120 to cause the second string of series connected LEDs 124 to illuminate at the desired dimming level. The gate drive signal 16 is generated based upon the feedback signals 17 received from the inverse buck voltage converter 120.

Figure 13:
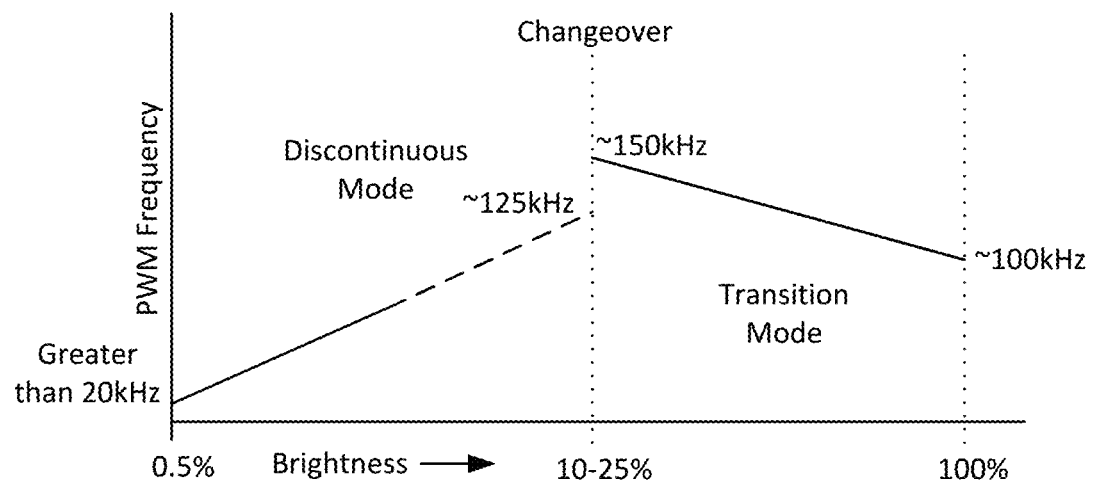
FIG. 13 is a graph of duty cycle vs. brightness level, showing the changeover by the LED control and driving circuit of FIG. 1 from transition mode to discontinuous mode.

The microcontroller 114 further operates to generate a gate drive signal 12 for the power factor correction circuit 108 based upon the feedback signals 13 received from the power factor correction circuit 108. This operation causes the power factor correction circuit 108 to operate in in transition mode where the desired dimming level is above a threshold brightness, but to operate in discontinuous mode where the desired dimming level is below the threshold brightness. This switchover happens around a brightness level of 10% to 25%. A graph showing the switchover point brightness level relative to duty cycle of the LEDs 122, 124 is shown in FIG. 13.

When the brightness is decreased, the load to the power factor correction circuit 108 is reduced. At a low brightness level, the switchover from transition mode to discontinuous mode is performed to supply the appropriate reduced level of power. The exact switchover point may depend upon the voltage from the AC mains 102. The switchover may be required because the duty cycle reaches its minimum level to operate in transition mode, so the PFC output voltage to the DC bus 108 remains at a constant level (450V±5%), and the power factor correction circuit 108 is operated in discontinuous mode. This switchover helps to prevent flicker, as flicker is reduced in discontinuous mode.

Figure 2:
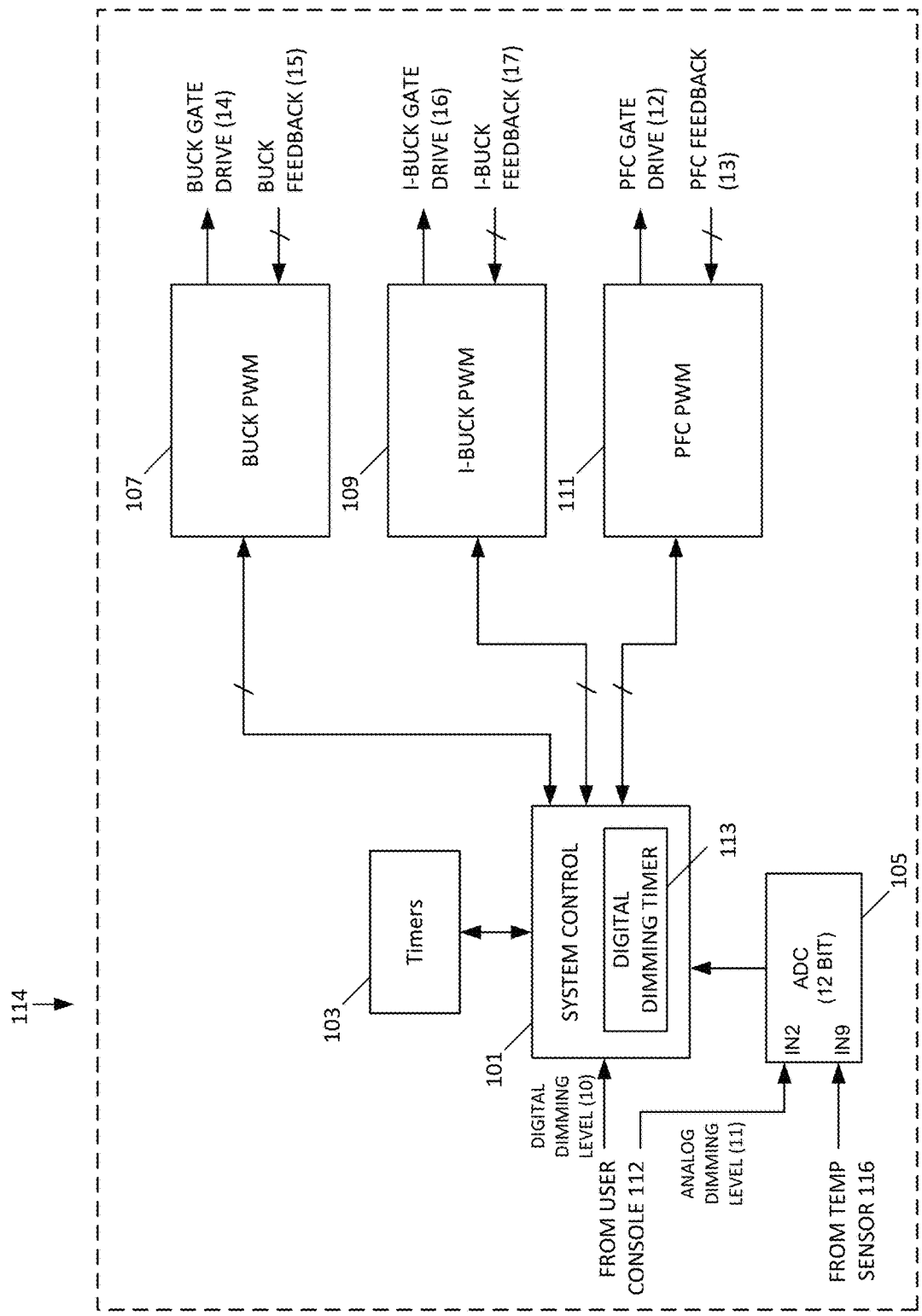
FIG. 2 is a block diagram of subcomponents of the microcontroller of FIG. 1.

With further reference to FIG. 2, details of the microcontroller 114 will now be given. The microcontroller 114 includes a system control block 101 (e.g. a processor) receiving the digital dimming input 10, and an analog to digital converter 105 receiving the analog dimming input 11, as well as input from the temperature sensor 116. The analog to digital converter 105 digitizes the analog dimming input 11 and provides the digitized version thereof to the system control block 101. The system control block also includes a digital dimmer timer 113. The digital dimmer timer 113 generates an enable signal 19 for the buck voltage converter 110 and an enable signal 20 for the inverse buck voltage converter 120.

The microcontroller 114 also includes pulse width modulation (PWM) circuits, in particular, a buck PWM circuit 107, an inverse buck PWM circuit 109, and a power factor correction PWM circuit 111. The buck PWM circuit 107 generates a gate drive signal 14 for the buck converter 110. The inverse buck PWM circuit 109 generates a gate drive signal 16 for the inverse buck converter 120. The power factor correction PWM circuit 111 generates a gate drive signal 12 for the power factor correction circuit 108.

Figure 3:
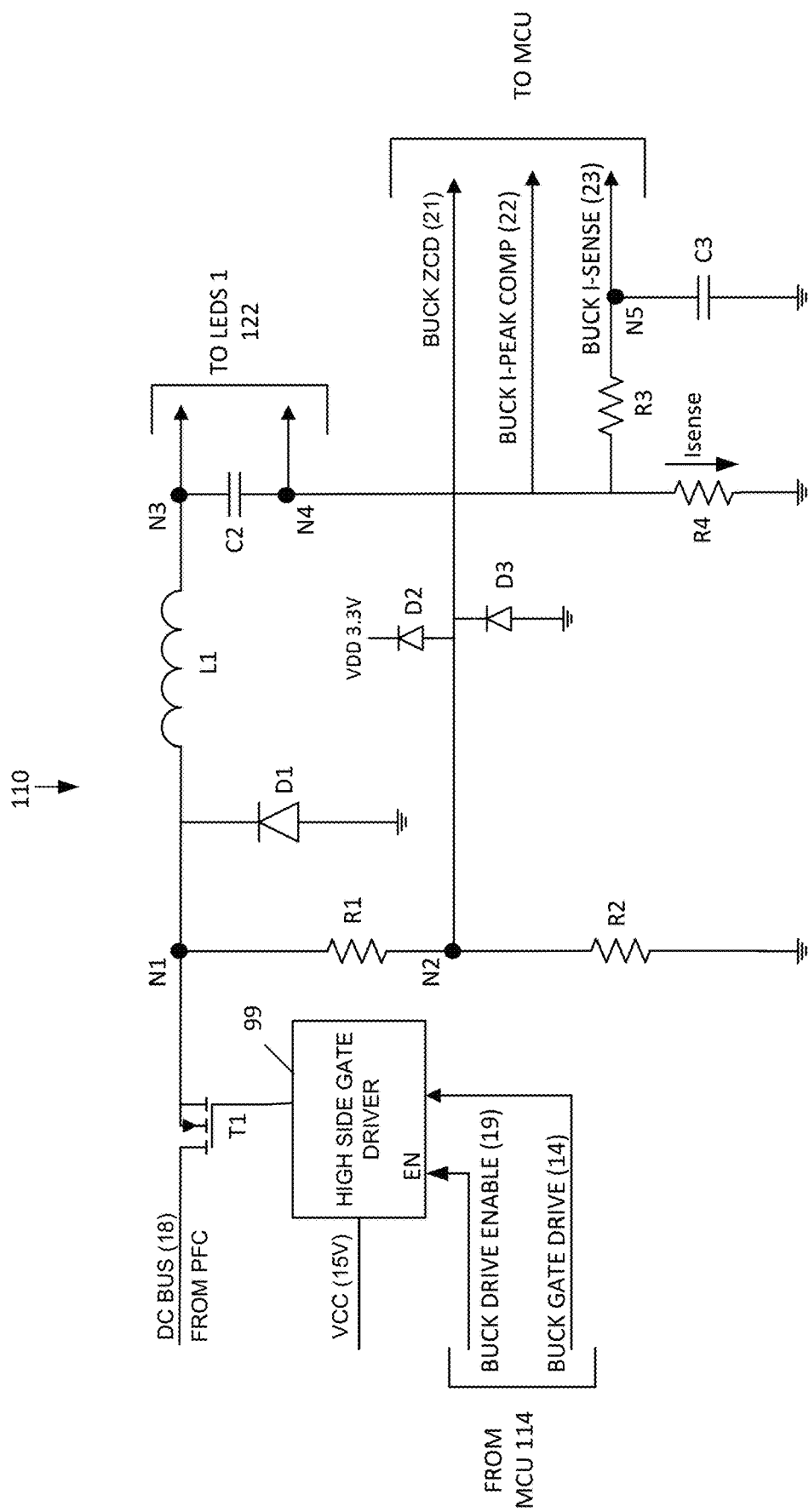
FIG. 3 is a schematic diagram of the buck converter of FIG. 1.

With additional reference to FIG. 3, the buck voltage converter 110 is now described. The buck voltage converter 110 includes a gate driver 99 powered from VCC and receiving the buck drive enable signal 19 and the buck gate drive signal 14. The gate driver 99 biases the gate of N-channel MOSFET T1, which has its drain coupled to the DC bus 18, and its source coupled to node N1. An inductor L1 is coupled between node N1 and node N3. A capacitor C2 is coupled between node N3 and node N4. A diode D1 is coupled between node N1 and ground. A resistor R1 is coupled between node N1 and node N2. A resistor R2 is coupled between node N2 and ground. A diode D2 is coupled between node N2 and VDD. A diode D3 is coupled between node N2 and ground. A resistor R4 is coupled between node N4 and ground. A resistor R2 is coupled between node N4 and node N5. A capacitor C3 is coupled between node N5 and ground.

In operation, if the buck drive enable signal 19 is asserted, switching of the transistor T1 is controlled by the buck gate drive signal 14. Where the buck gate drive signal 14 is asserted, the gate driver 99 biases the gate of the transistor T1 so as to turn on the transistor T1. This charges up the inductor L1, and causes a sense current Isense to be drawn through resistor R4. The sense current Isense represents the current flowing through LEDs 122. A buck current sense signal 23 is generated at node N5, and represents a filtered version of the sense current Isense. A buck current peak signal 22 is generated at node N4, and represents an unfiltered version of the sense current Isense. Based upon the buck current peak signal 22, the system control 101 causes the buck PWM 107 to deassert the buck gate drive signal 14 when the buck current peak signal 22 hits a threshold level. As a result, the inductor L1 discharge to ground. As the inductor L1 discharges, ultimately the capacitor C2 charges up, resulting in the buck zero crossing detect signal 21 going high. At the appropriate time, the system control 101 causes the buck PWM 107 to assert the buck gate drive signal 14, beginning the process again.

Figure 5A:
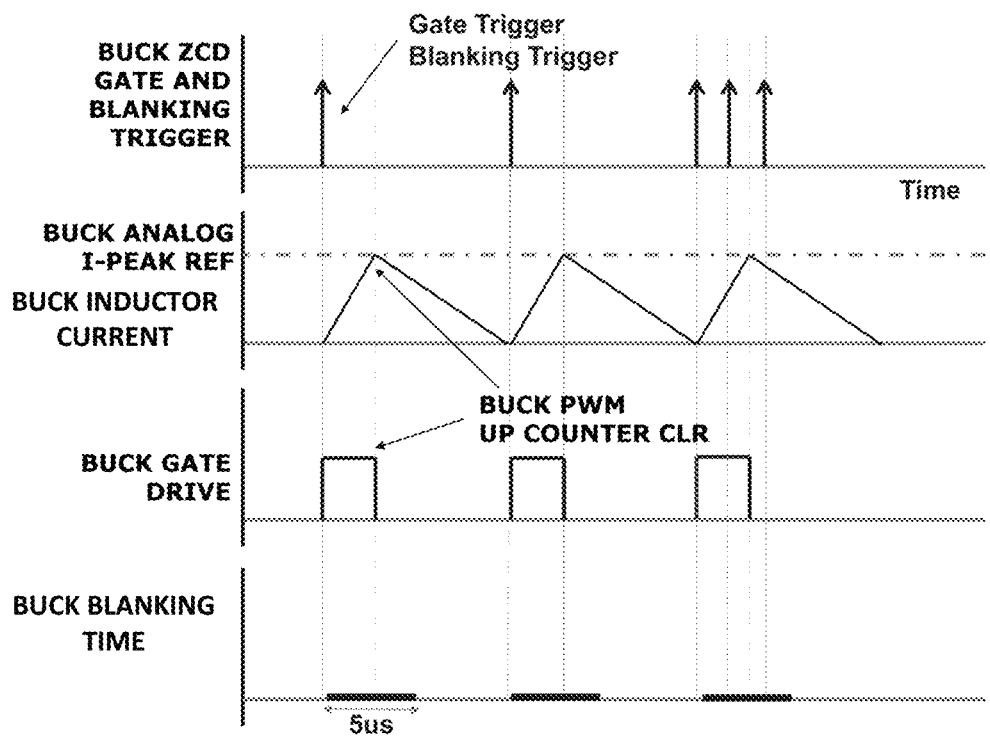
FIGS. 5A-5B are timing diagrams showing the buck converter of FIG. 1 in operation.
Figure 5B:
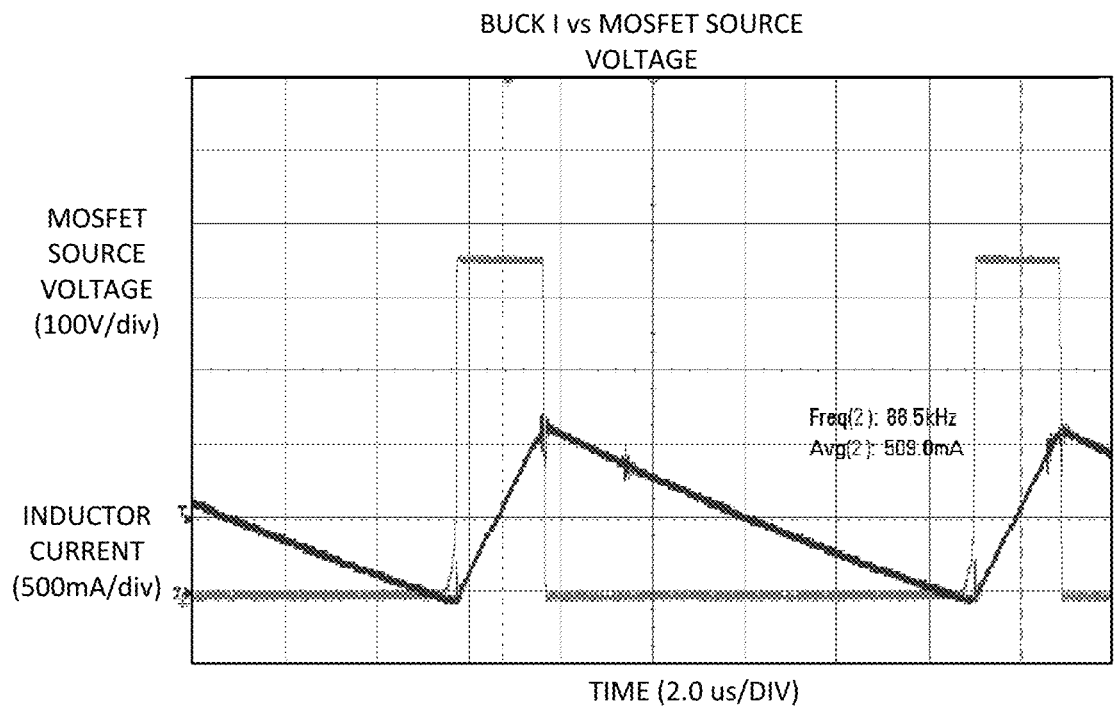

Operation of the buck PWM 107 is now described. The buck PWM 107 generates the buck gate drive signal 14 as a function of the buck zero cross detect signal 21, the buck current peak comparison signal 22, and the buck current sense signal 23. In greater detail, when the zero cross detect signal is asserted, a buck PWM timer begins counting. As the counter reaches one, the buck gate drive signal 14 output by the timer rises to high, turning on MOSFET T1. The buck current through the LEDs 122 begins ramp-up immediately after the detected zero crossing, as shown in FIG. 5A. This ramp-up is shown in greater detail in FIG. 5B.

When the buck current peak comparison signal 22 reaches a set reference threshold, the buck gate drive signal 14 is reset to low by the buck PWM 107. When the buck PWM timer reaches an automatic reset value, the buck PWM timer expires and counting stops, and the buck gate drive signal 14 remains low. When the zero cross detect signal is again asserted, the buck PWM timer is reset and begins counting again.

A trigger is generated at each zero crossing indicated by the zero cross detect signal 21. This operation can be seen in FIG. 5A, where beginning with each trigger, a buck blanking time begins. This serves to mask zero crossings indicated by the zero cross detect signal 21 for that time period, which would otherwise disrupt smooth ramp-up of the buck current through the LEDs 122. This can be seen in FIG. 5A, where the two rightmost triggers are ignored. The buck blanking time is removed at the expiration of its time period, as shown, thereby unmasking the zero cross detect signal 21.

Figure 6:
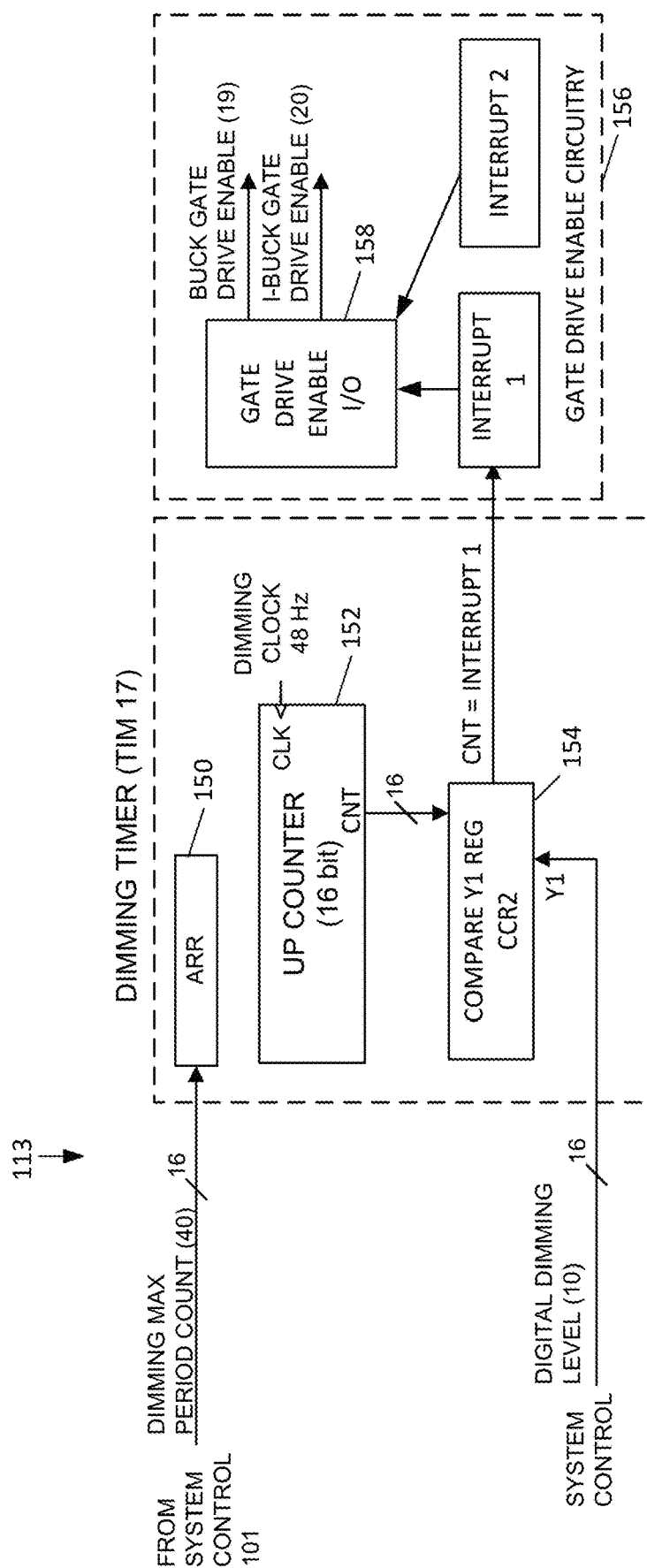
FIG. 6 is a schematic block diagram of the digital dimmer timer block of FIG. 2.

Referring now to FIG. 6, the digital dimmer timer 113 is now described. The digital dimmer timer 113 includes an automatic reset register 150 which receives a dimming max period count signal 40. An up counter 152 clocked by a dimming clock generates a count CNT. A capture and compare register 154 compares CNT to the digital dimming input or level 10. When the count CNT is equal to the digital dimming level 10, a first interrupt Y1 is generated by gate drive enable circuitry 156. In response to the first interrupt being generated, gate drive enable input output circuitry 158 in the gate drive enable circuitry 156 deasserts the buck gate drive enable signal 19 and the I-buck gate drive enable signal 20, thereby preventing the high side gate driver 99 of the buck voltage converter 110 from switching the MOSFET T1 (FIG. 3) as a function of the received buck gate drive signal 14, and preventing the gate driver 160 of the inverse buck voltage converter 120 from switching the MOSFET T2 (FIG. 8) as a function of the received inverse buck gate drive signal 16.

Once the value of CNT reaches the dimming max period count signal 40 stored in the automatic reset register 150, the up counter 152 is reset. Upon the up counter 152 being reset, a second interrupt is generated by the gate drive enable circuitry 156. In response to the second interrupt being generated, the gate drive enable input output circuitry 158 asserts the buck gate drive enable signal 19 and the I-buck gate drive enable signal 20, thereby permitting the high side gate driver 99 of the buck voltage converter 110 to switch the MOSFET T1 (FIG. 3) as a function of the received buck gate drive signal 14, and permitting the gate driver 160 of the inverse buck voltage converter 120 to switch the MOSFET T2 (FIG. 8) as a function of the received inverse buck gate drive signal 16.

Figure 7:
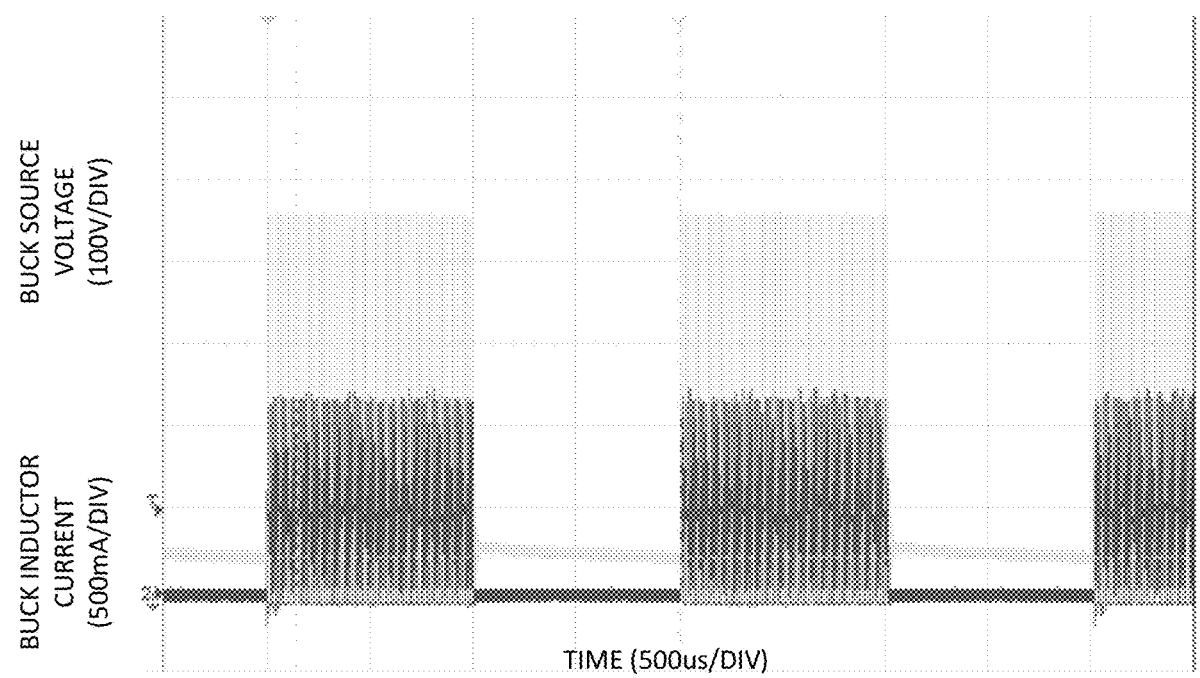
FIG. 7 is a graph of buck inductor current and buck source voltage vs. time, providing details of the operation of the buck converter of FIG. 1 in operation as interfaced with the digital dimmer PWM of FIG. 6.

Therefore, when digital dimming is to be used, the digital dimmer timer 113 serves to produce the proper duty cycle for the current output to the LEDs 122 and 124 so as to achieve the desired brightness level. Shown in FIG. 7 are the voltage at the source of MOSFET T1 and the current through L1 of the buck voltage converter 110 (FIG. 3) when controlled by the digital dimmer timer 113.

Figure 8:
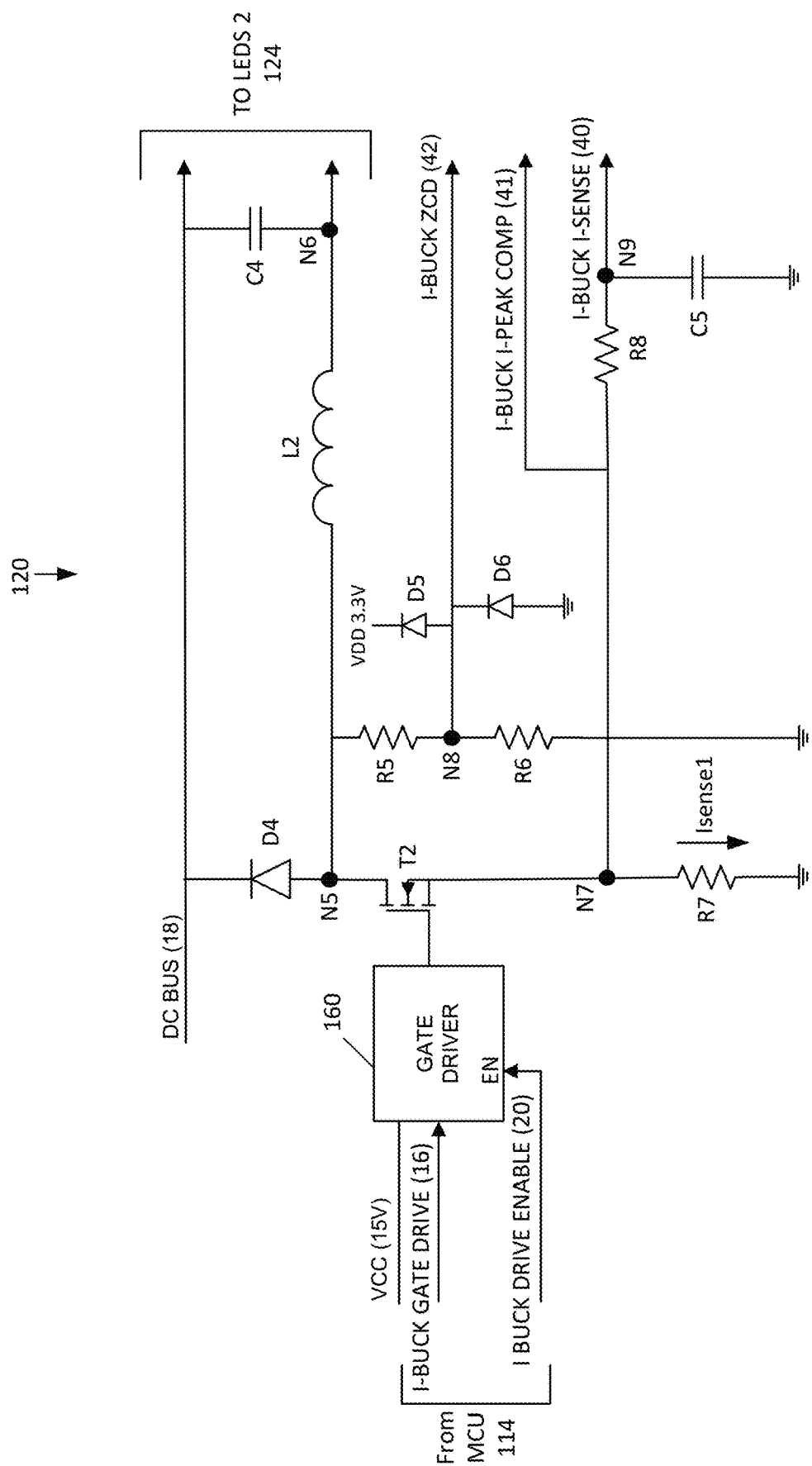
FIG. 8 is a schematic diagram of the inverse buck converter of FIG. 1.

Shown in FIG. 8 are the specifics of the inverse buck converter 120. The inverse buck converter includes a gate driver 160 powered by VCC and that receives the buck gate drive signal 16 and the inverse buck drive enable signal 20. When enabled by the inverse buck drive enable signal 20, the gate driver 160 switches the N-channel MOSFET T2 in response to the inverse buck gate drive signal 16.

MOSFET T2 has its drain coupled to node N7 and its source coupled to node N5. A diode D4 is coupled between node N5 and the DC Bus 18. An inductor L2 is coupled between node N5 and node N6. A capacitor C4 is coupled between the DC Bus 18 and node N6, as are the LEDs 124.

Resistor R7 is coupled between node N7 and ground, and resistor R8 is coupled between node N7 and node N9. Capacitor C5 is coupled between node N9 and ground. Resistor R5 is coupled between node N5 and node N8. Resistor R6 is coupled between node N8 and ground. Diode D5 is coupled between node N8 and VDD, and diode D6 is coupled between node N8 and ground.

In operation, if the inverse buck drive enable signal 20 is asserted, switching of the MOSFET T2 is controlled by the inverse buck gate drive signal 16. Where the inverse buck gate drive signal 16 is asserted, the gate driver 160 biases the gate of the transistor T2 so as to turn on the MOSFET T2. This charges up the inductor L2, and causes a sense current Isense1 to be drawn through resistor R7. The sense current Isense1 represents the current flowing through LEDs 124. An inverse buck current sense signal 40 is generated at node N9, and represents a filtered version of the sense current Isense1. An inverse buck current peak signal 41 is generated at node N7, and represents an unfiltered version of the sense current Isense1. Based upon the inverse buck current peak signal 41, the system control 101 causes the inverse buck PWM 109 to deassert the inverse buck gate drive signal 16 when the inverse buck current peak signal 41 hits a threshold level. As a result, the inductor L2 begins to discharge to ground. As the inductor L2 discharges to ground, causing assertion of the inverse buck zero crossing detect signal 40 when the current through the inductor L2 reaches zero, the capacitor C4 charges up. After the zero crossing detection, the system control 101 causes the inverse buck PWM 109 to assert the inverse buck gate drive signal 16, beginning the process again.

Figure 9A:
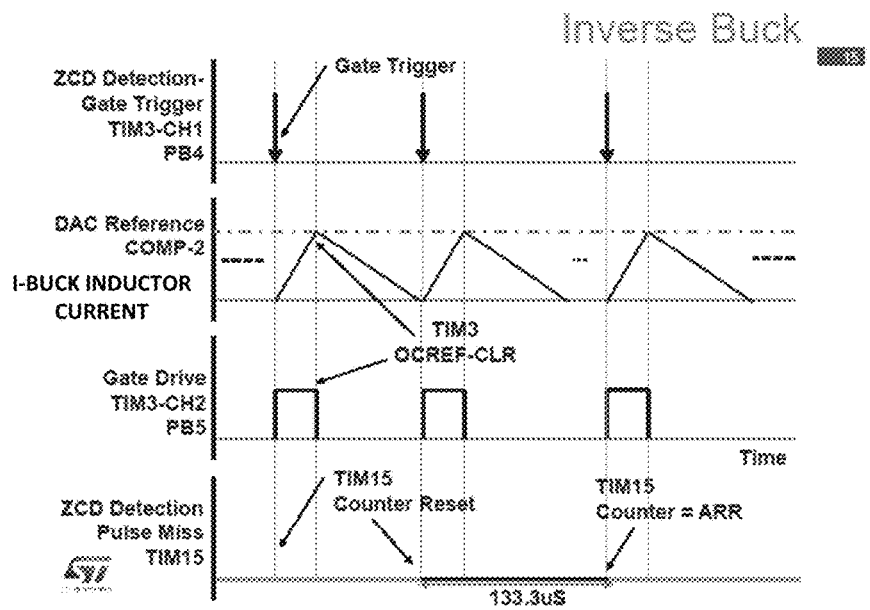
FIGS. 9A-9B are timing diagrams showing the inverse buck converter of FIG. 1 in operation.
Figure 9B:
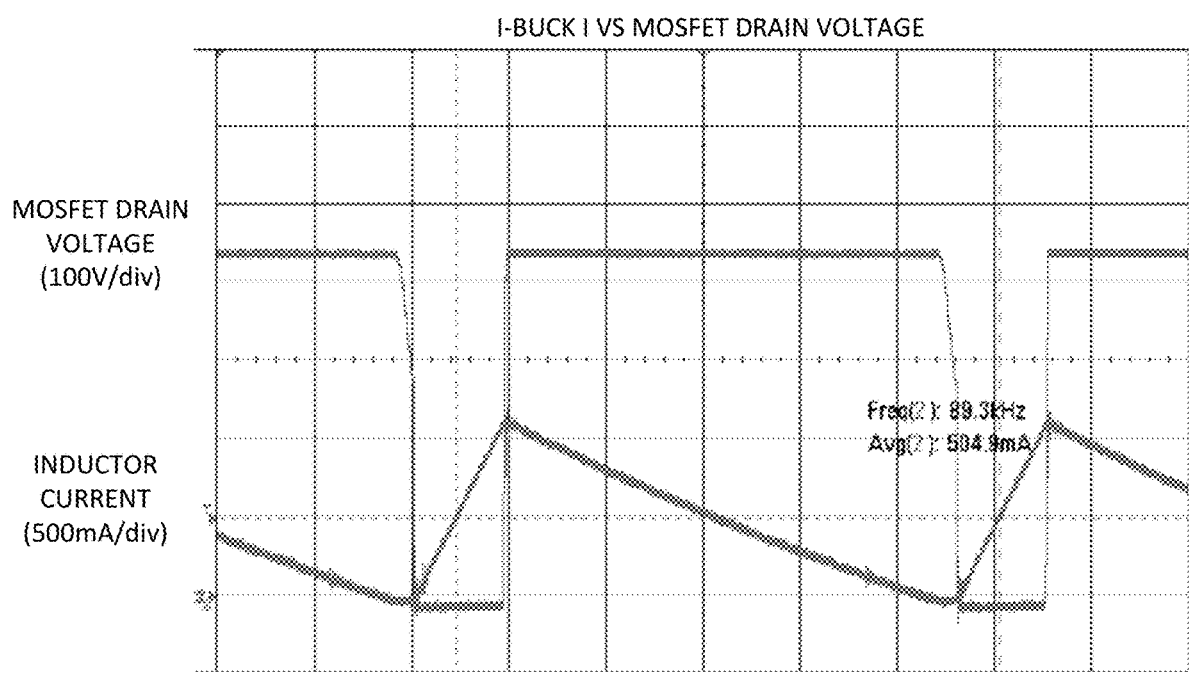

Operation of the inverse buck PWM 109 is now described. The inverse buck PWM 109 generates the inverse buck gate drive signal 16 as a function of the inverse buck zero cross detect signal 42, the inverse buck current peak comparison signal 41, and the inverse buck current sense signal 40. When the inverse buck zero cross detect signal 42 is asserted, an inverse buck PWM timer begins counting. As the counter reaches one, the inverse buck gate drive signal 16 output by the timer rises to high, turning on MOSFET T2. The buck current through the LEDs 124 begins ramp-up immediately after the detected zero crossing, as shown in FIG. 9A. This ramp-up is shown in greater detail in FIG. 9B.

When the inverse buck current peak comparison signal 41 reaches a set reference threshold, the inverse buck gate drive signal 16 is reset to low by the inverse buck PWM 109. When the inverse buck PWM timer reaches an automatic reset value, the inverse buck PWM timer expires and counting stops, and the inverse buck gate drive signal 16 remains low. When the inverse buck zero cross detect signal 42 is again asserted, the inverse buck PWM timer is reset and begins counting again.

Figure 10:
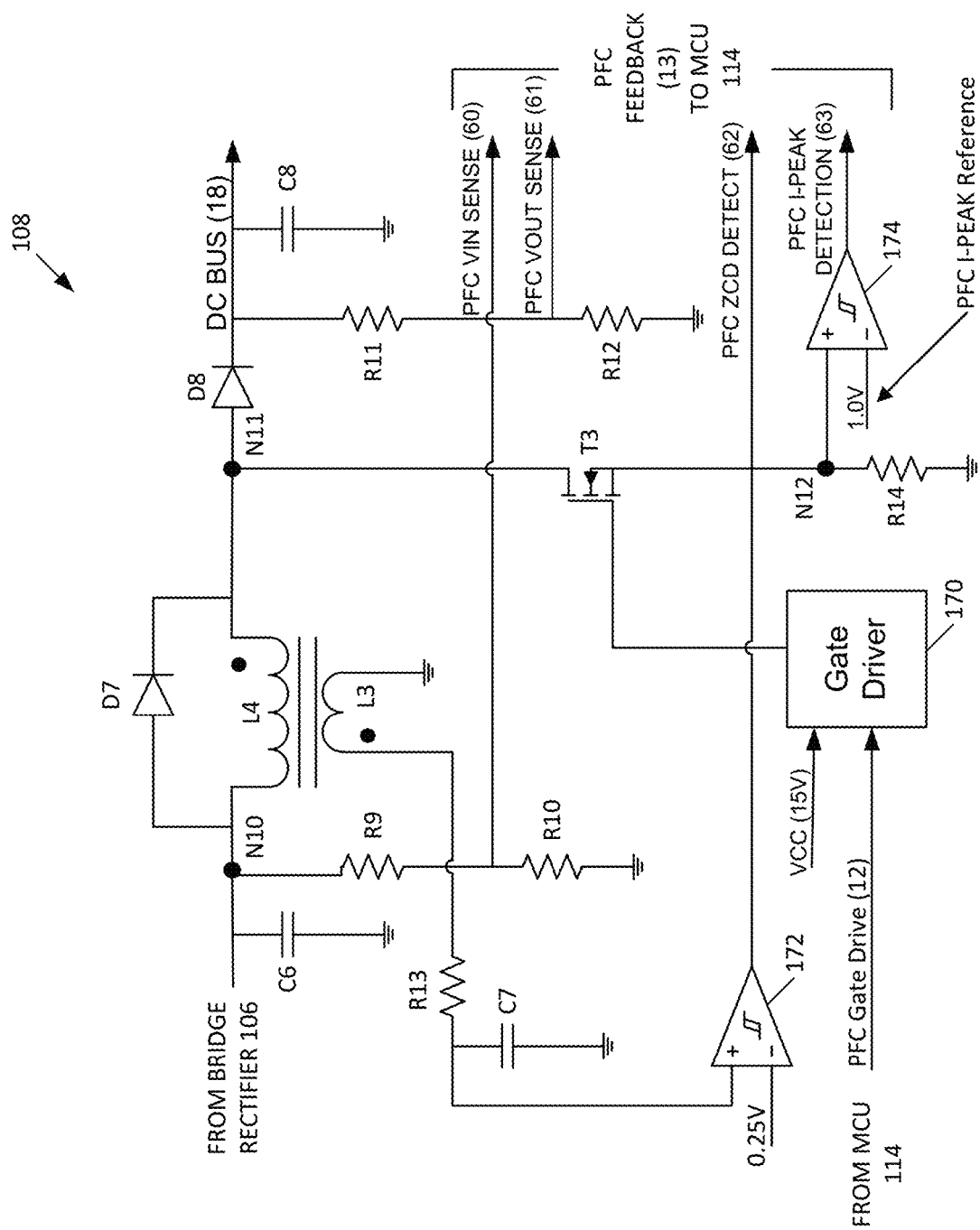
FIG. 10 is a schematic diagram of the PFC circuit of FIG. 1.

The power factor correction circuit 108 is now described with reference to FIG. 10. The power factor correction circuit 108 includes a diode D7 coupled to receive the output from bridge rectifier 106 at node N10. Capacitor C6 is coupled between node N10 and ground. Inductor L4 is coupled in parallel with the diode D7 between nodes N10 and N11. Inductor L3 is magnetically coupled to inductor L4, and is coupled between resistor R13 and ground. Resistor R13 is coupled to the non-inverting input of comparator 172, and a power factor correction zero crossing detect reference voltage of 0.25V is coupled to the inverting input of comparator 172.

Capacitor C7 is coupled between the inverting input of comparator 172 and ground. Resistors R9 and R10 are coupled in series between node N10 and ground. Diode D8 is coupled between node N11 and the DC bus 18. Capacitor C8 is coupled between DC bus 18 and ground. Resistors R11 and R12 are coupled in series between the DC bus 18 and ground.

An N-channel MOSFET T3 has its drain coupled to node N11 and its source coupled to node N12. A gate driver 170 is powered by VCC and serves to bias the gate of the MOSFET T3 as a function of the power factor correction gate driving signal 12 received from the MCU 114.

A resistor R14 is coupled between node N12 and ground. Comparator 174 has its non-inverting input coupled to node N12, and receives a power factor correction current peak reference voltage of 1V at its inverting input.

In operation, the power factor correction circuit 108 serves to correct the power factor of the power drawn by the LED control and driving circuit 100 such that the DC bus 118 has a high power factor. A power factor voltage input sense signal 60 is produced at the center tap between resistors R9 and R10, and a power factor voltage output sense signal 61 is produced at the center rap between resistors R11 and R12. A power factor correction zero crossing detect signal 62 is generated at the output of the comparator 172, and a power factor current peak detection signal 63 is generated at the output of the comparator 174.

Figure 11:
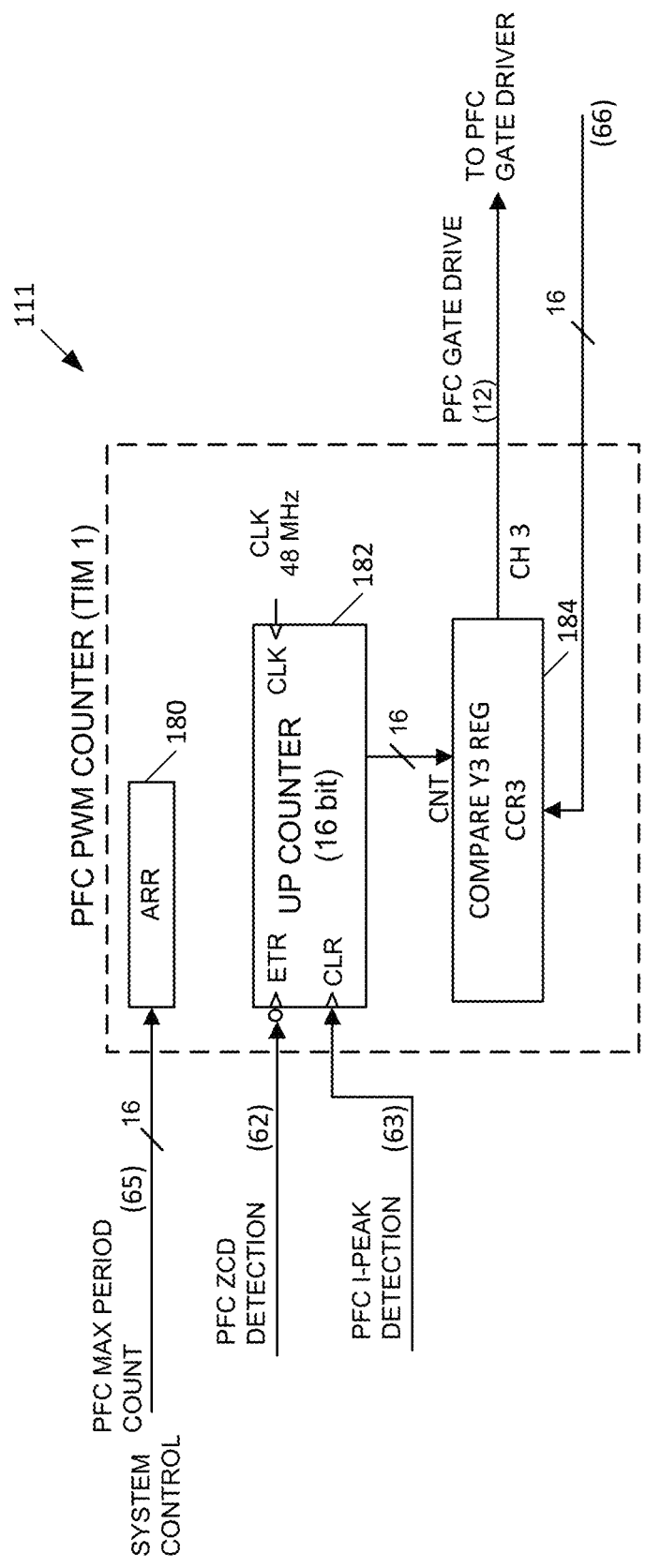
FIG. 11 is a block diagram of the timer circuit in the PFC PWM circuitry of FIG. 2.

With additional reference to FIG. 11, the power factor correction PWM circuitry 111 is now described. The power factor correction PWM circuitry 111 includes an automatic reset register 180 which receives a power factor correction max period count signal 65. Up counter 182 is clocked via a 48 MHz buck clock signal.

Figure 12:
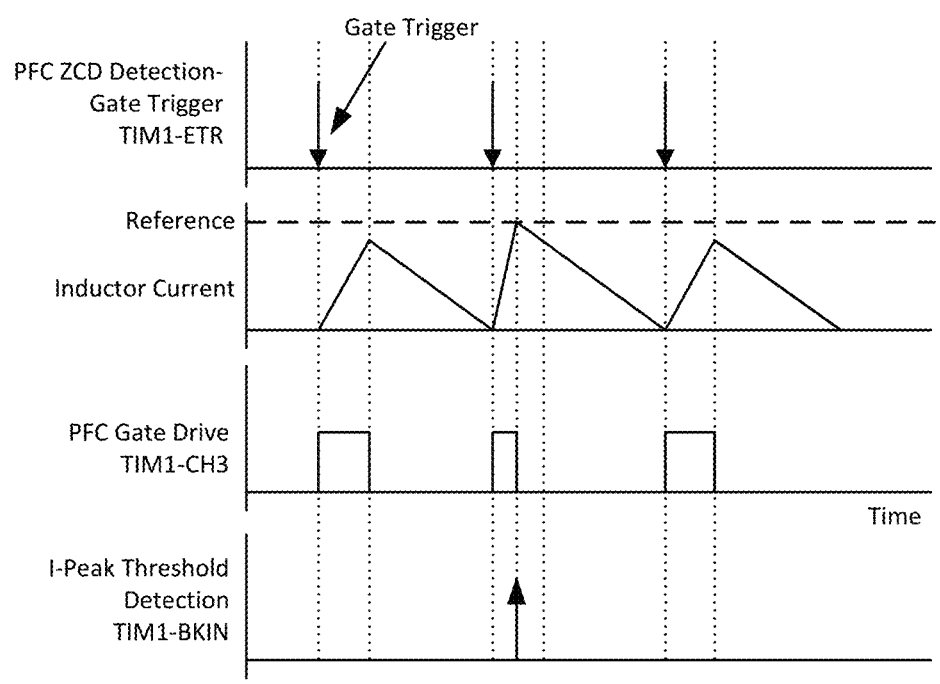
FIG. 12 is a timing diagram showing the PFC circuit of FIG. 1 in operation.

Operation of the power factor correction circuit 108 by the power factor correction PWM circuitry 111 in transition mode is shown in FIG. 12. As can be seen, the inductor L4 current begins to ramp up when the up counter 182 is triggered by assertion of the power factor correction zero crossing detection signal 62 (resulting in assertion of the power factor correction gate drive signal 12). Where ramp up has occurred for a duration sufficient for the up counter 182 to reach the power factor correction max period count stored in the automatic reset register 180, the up counter 182 is reset, as shown in the first ramp down of the inductor L4 current in FIG. 12. However, if the power factor current peak detection signal 62 is asserted as a result of the voltage across R13 equaling the power factor correction current peak reference voltage, indicating that the inductor L4 current has reached a maximum threshold value, then the up counter 182 is cleared, resulting in ramp down of the inductor L4 current, as shown in the second ramp down of the inductor L4 current in FIG. 12.

Figure 14:
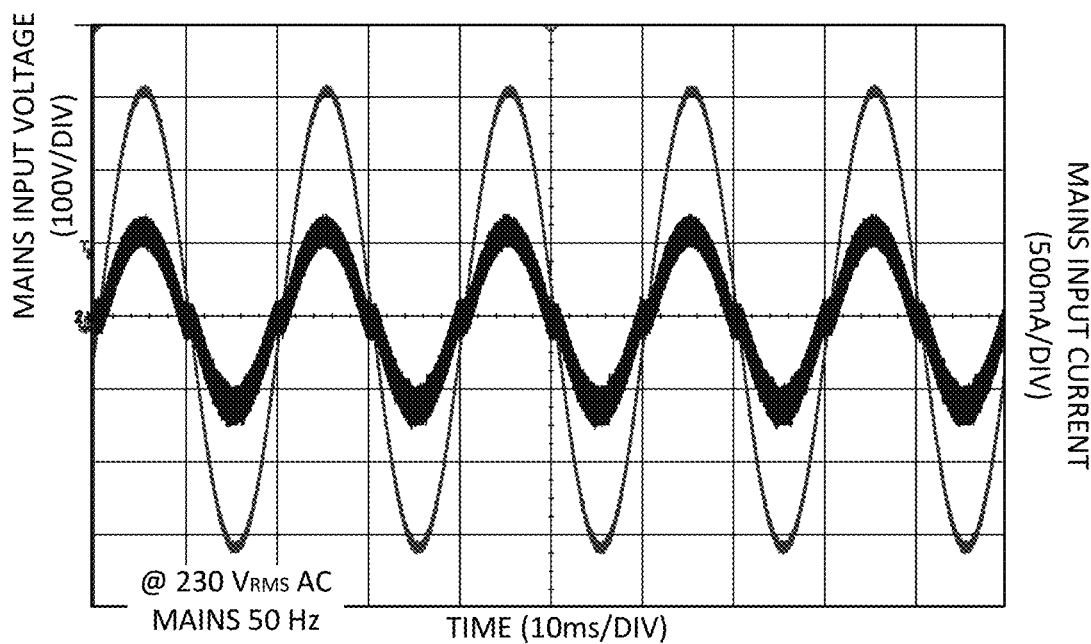
FIG. 14 is a graph of input voltage vs input current of the PFC circuit of FIG. 1 in operation.
Figure 15:
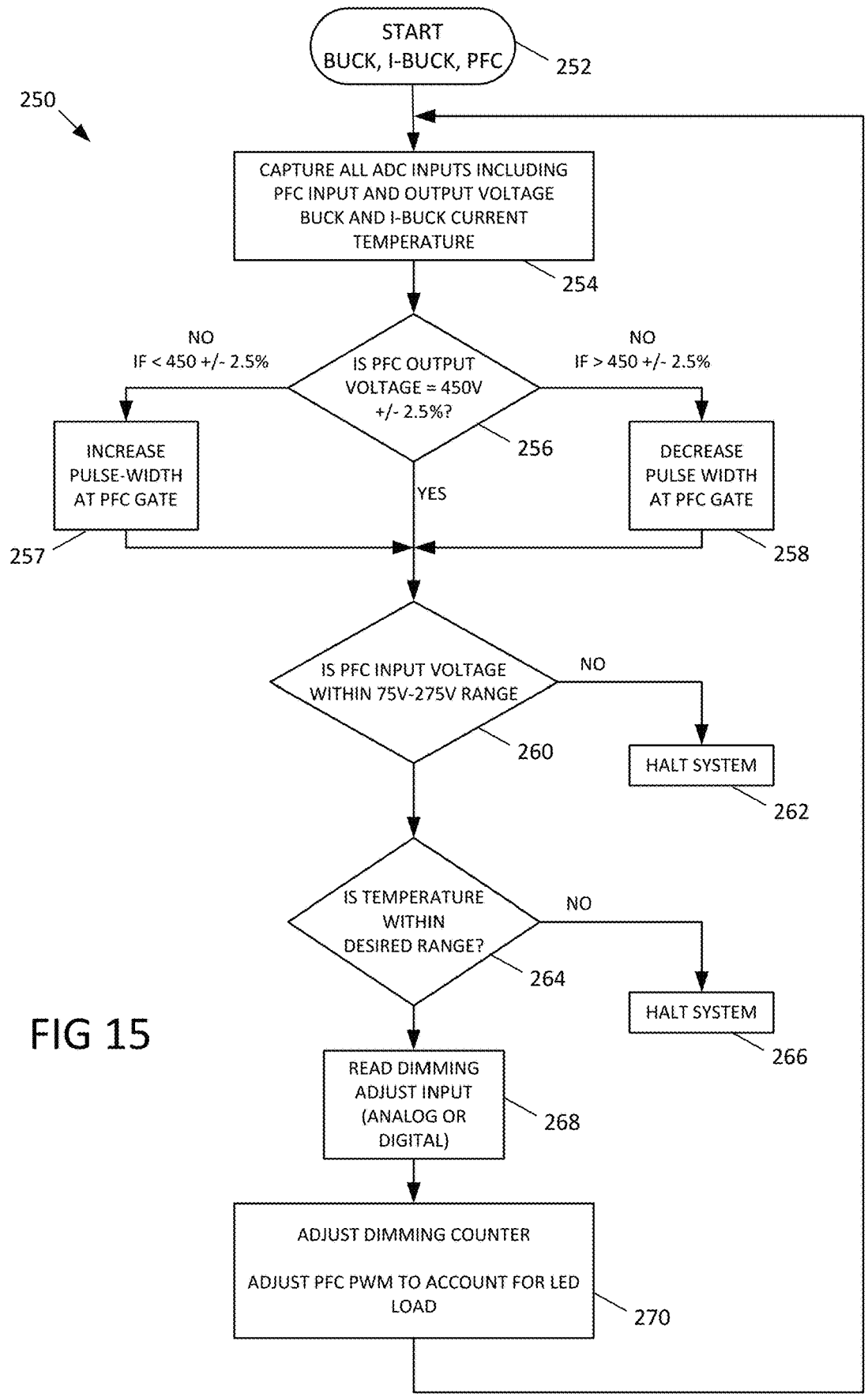
FIG. 15 is a flowchart of operation of the system control block 101 of FIG. 1.

The voltage and current as drawn by the power factor correction circuit 108 onto the DC bus 18 is shown in the waveforms of FIG. 14.

Operation of the system control block 101 now described with reference to flowchart 250 of FIG. 16. After the start (at Block 252), the system control block 101 reads the digitized versions of all inputs to the ADC 105, including the temperature sensor input 116, analog dimming level 11, buck current sense signal 23, inverse buck current sense signal 40, power factor correction input voltage sense signal 60, and power factor correction output voltage sense signal 61 (at Block 254). If the power factor correction output voltage sense signal 61 is not within a threshold of a desired voltage (here as an example, the desired voltage being 450 V, and the threshold being ±2.5%), and the power factor correction output voltage sense signal 61 is on the low side of the threshold, then the pulse width of the PFC gate drive signal 12 is increased by the system control block 101 (at Block 257). If the power factor correction output voltage sense signal 61 is not within the threshold of the desired voltage and the power factor correction output voltage sense signal 61 is on the high side of the threshold, then the pulse with of the PFC gate drive signal 12 is decreased by the system control block 101 (at Block 258).

It is then checked whether the power factor correction input voltage 60 is not within a given voltage range, such as 75 V to 275 V (at Block 260), and if so, the system is then halted (at Block 262). If the power factor correction input voltage 60 is within the given voltage range, then it is checked whether the system temperature read by the temperature sensor 116 (at Block 262). If the system temperature read by the temperature sensor 116 is not within the given temperature range (at Block 264), then the system is halted (at Block 266). If the system temperature read by the temperature sensor 116 is within the given temperature range (at Block 264), then the desired dimming level is read (at Block 268), and the digital dimmer timer 113 is adjusted accordingly. In addition, the power factor correction PWM circuitry 111 is also adjusted to account for the load of the LEDs 122, 124 (at Block 270). A full iteration of the control of the system control block 101 is now complete, and operation returns to Block 254.

Although the above has been described with respect to the LED control and driving circuit 100 including both a buck voltage converter 110 and an inverse buck voltage converter 120, which is to say two separate voltage converters, it should be understood that in some instances there may be but one voltage converter, or any number of voltage converters, and that these voltage converters may be of any useful kind as determined by the specific application.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:
1. A circuit, comprising:
a power factor correction circuit configured to receive a rectified mains voltage and provide output to a DC voltage bus, wherein the power factor correction circuit is configured to generate a plurality of feedback signals, wherein the plurality of feedback signals comprise an input sense signal that is a function of the rectified mains voltage as drawn by the power factor correction circuit, an output sense signal that is a function of output provided to the DC voltage bus, a zero crossing detect signal that is a function of zero crossings of an inductor current in the power factor correction circuit, and a peak current detect signal generated based upon instances of the inductor current exceeding a threshold current;
wherein the power factor correction circuit comprises:
an input node configured to receive the rectified mains voltage;
a transformer having a first winding coupled between the input node and a first node;
a diode coupled between the first node and the DC voltage bus;
a first voltage divider coupled between the DC voltage bus and ground, a tap of the first voltage divider providing the output sense signal;

wherein the transformer has a second winding coupled between a second node and ground, the second winding being electromagnetically coupled to the first winding;

a filter coupled between the second node and a third node;

a comparator having a first input coupled to the third node, a second input coupled to a reference voltage, and an output providing the zero crossing detect signal;

a second voltage divider coupled between the input node and ground, wherein a tap of the second voltage divider provides the input sense signal; and a peak current detect signal generation circuit coupled to receive input from the first node;

a voltage converter configured to receive input from the DC voltage bus and provide output configured to drive a string of light emitting diodes (LEDs); and a microcontroller configured to:
receive a plurality of digital feedback signals from the voltage converter;
control the voltage converter based upon a user desired brightness level and the plurality of digital feedback signals; and
receive a plurality of feedback signals from the power factor correction circuit, and based thereupon:
operate the power factor correction circuit in transition mode if the user desired brightness level is above a threshold brightness, and
operate the power factor correction circuit in discontinuous mode if the user desired brightness level is below the threshold brightness.

2. The circuit of claim 1, wherein the peak current detect signal generation circuit comprises:
a gate driver configured to receive a power factor correction gate drive signal from the microcontroller, and providing a control signal output;
a transistor coupled between the first node and a fourth node, the transistor biased by the control signal output; and
a comparator having a first input coupled to the fourth node, a second input coupled to receive a second reference voltage, and an output generating the peak current detect signal.

3. The circuit of claim 2, wherein the microcontroller is further configured to:
receive temperature feedback indicating an operating temperature;
if the plurality of feedback signals from the power factor correction circuit indicate that an output voltage of the power factor correction circuit is below a threshold voltage, generate the power factor correction gate drive signal so as to increase a pulse width of the control signal output;
if the plurality of feedback signals from the power factor correction circuit indicate that an output voltage of the power factor correction circuit is above the threshold voltage, generate the power factor correction gate drive signal so as to decrease the pulse width of the control signal output;
if an input voltage to the power factor correction circuit is not within a desired operating range, halt operation of the circuit;
if the temperature feedback indicates that the operating temperature is not within a desired temperature range, halt operation of the circuit; and if the temperature feedback indicates that the operating temperature is within the desired temperature range, adjust the power factor correction gate drive signal based upon a load current drawn by the string of LEDs.

4. The circuit of claim 1, wherein the microcontroller comprises:
a system control block configured to receive the user desired brightness level, the plurality of digital feedback signals from the voltage converter, and the plurality of feedback signals from the power factor correction circuit;
a voltage converter pulse width modulation circuit configured to be controlled by the system control block, operate based upon at least some of the plurality of digital feedback signals from the voltage converter, and generate a gate drive signal for the voltage converter; and
a power factor converter pulse width modulation circuit configured to be controlled by the system control block, operate based upon some of the plurality of feedback signals from the power factor correction circuit, and generate a gate drive signal for the power factor correction circuit.

5. The circuit, wherein the threshold brightness is below 25% of a maximum possible brightness of the string of LEDs.

6. The circuit, wherein the threshold brightness is between below 10% of a maximum possible brightness of the string of LEDs.

7. The circuit, wherein the operation of the power factor correction circuit in the discontinuous mode if the user desired brightness level is below the threshold brightness enables light emission by the string of LEDs that does not irritate a human eye via flicker.

8. The circuit, wherein the operation of the power factor correction circuit in the discontinuous mode if the user desired brightness level is below the threshold brightness enables light emission by the string of LEDs at the user desired brightness level of 5% but that does not irritate a human eye via flicker.

9. A circuit, comprising:
a power factor correction circuit configured to receive a rectified mains voltage and provide output to a DC voltage bus;
a voltage converter configured to receive input from the DC voltage bus and provide output configured to drive a string of light emitting diodes (LEDs); and
a microcontroller configured to:
receive a plurality of digital feedback signals from the voltage converter;
control the voltage converter based upon a user desired brightness level and the plurality of digital feedback signals; and
receive a plurality of feedback signals from the power factor correction circuit, and based thereupon:
operate the power factor correction circuit in transition mode if the user desired brightness level is above a threshold brightness, and
operate the power factor correction circuit in discontinuous mode if the user desired brightness level is below the threshold brightness;
wherein the voltage converter comprises:
a power transistor coupled between the DC voltage bus and a first node;
a voltage divider coupled between the first node and ground;

wherein a buck zero cross detect signal is generated at a tap of the voltage divider;
an inductor coupled between the first node and a second node;
a capacitor coupled between the second node and a third node; and
a filter coupled to the third node;
wherein the string of LEDs is coupled between the second node and the third node;
wherein a buck current peak comparison signal is generated at the third node;
wherein a buck current sense signal is generated at an output of the filter;
wherein the plurality of digital feedback signals comprise the buck zero cross detect signal, the buck current peak comparison signal, and the buck current sense signal.

10. The circuit of claim 9, further comprising a first diode coupled between the first node and ground, a second diode coupled between the tap of the voltage divider and a voltage reference, and a third diode coupled between the tap of the voltage divider and ground.

11. The circuit of claim 10, further comprising a gate driver configured to receive as input a buck drive enable signal and a buck gate drive signal from the microcontroller, and to bias the power transistor based thereupon.

12. A circuit, comprising:
a power factor correction circuit configured to receive a rectified mains voltage and provide output to a DC voltage bus;
a voltage converter configured to receive input from the DC voltage bus and provide output configured to drive a string of light emitting diodes (LEDs); and
a microcontroller configured to:
receive a plurality of digital feedback signals from the voltage converter;
control the voltage converter based upon a user desired brightness level and the plurality of digital feedback signals; and
receive a plurality of feedback signals from the power factor correction circuit, and based thereupon:
operate the power factor correction circuit in transition mode if the user desired brightness level is above a threshold brightness, and
operate the power factor correction circuit in discontinuous mode if the user desired brightness level is below the threshold brightness;
wherein the microcontroller comprises:
a system control block configured to receive the user desired brightness level, the plurality of digital feedback signals from the voltage converter, and the plurality of feedback signals from the power factor correction circuit;
a voltage converter pulse width modulation circuit configured to be controlled by the system control block, operate based upon at least some of the plurality of digital feedback signals from the voltage converter, and generate a gate drive signal for the voltage converter; and
a power factor converter pulse width modulation circuit configured to be controlled by the system control block, operate based upon some of the plurality of feedback signals from the power factor correction circuit, and generate a gate drive signal for the power factor correction circuit;
wherein the voltage converter is configured to generate the plurality of digital feedback signals to include at least a zero cross detect signal; and wherein the voltage converter pulse width modulation circuit generates the gate drive signal for the voltage converter by:
(a) in response to assertion of the zero cross detect signal, causing a dimming timer to begin counting;
(b) when the dimming timer reaches a given value, asserting the gate drive signal;
(c) deasserting the gate drive signal when an inductor current in the voltage converter reaches a threshold value;
(d) stop counting of the dimming timer when the dimming timer reaches an automatic reset value, and reset the dimming timer to zero without causing the dimming timer to again begin counting; and
(e) when the zero cross detect signal is again asserted, returning to (a).

13. The circuit of claim 12, wherein the operation of the power factor correction circuit in the discontinuous mode if the user desired brightness level is below the threshold brightness enables light emission by the string of LEDs that does not irritate a human eye via flicker.

14. The circuit of claim 12, wherein the operation of the power factor correction circuit in the discontinuous mode if the user desired brightness level is below the threshold brightness enables light emission by the string of LEDs at the user desired brightness level of 5% but that does not irritate a human eye via flicker.

15. A circuit, comprising:
a power factor correction circuit configured to receive a rectified mains voltage and provide output to a DC voltage bus;
a voltage converter configured to receive input from the DC voltage bus and provide output configured to drive a string of light emitting diodes (LEDs); and
a microcontroller configured to:
receive a plurality of digital feedback signals from the voltage converter;
control the voltage converter based upon a user desired brightness level and the plurality of digital feedback signals; and
receive a plurality of feedback signals from the power factor correction circuit, and based thereupon:
operate the power factor correction circuit in transition mode if the user desired brightness level is above a threshold brightness, and
operate the power factor correction circuit in discontinuous mode if the user desired brightness level is below the threshold brightness;
wherein the microcontroller comprises:
a system control block configured to receive the user desired brightness level, the plurality of digital feedback signals from the voltage converter, and the plurality of feedback signals from the power factor correction circuit;
a voltage converter pulse width modulation circuit configured to be controlled by the system control block, operate based upon at least some of the plurality of digital feedback signals from the voltage converter, and generate a gate drive signal for the voltage converter; and
a power factor converter pulse width modulation circuit configured to be controlled by the system control block, operate based upon some of the plurality of feedback signals from the power factor correction circuit, and generate a gate drive signal for the power factor correction circuit;

wherein the power factor correction circuit is configured to generate the plurality of feedback signals, wherein the plurality of feedback signals comprise at least a zero crossing detect signal that is a function of zero crossings of an inductor current in the power factor correction circuit; and wherein the power factor converter pulse width modulation circuit is configured to generate the gate drive signal for the power factor correction circuit by:
(a) in response to assertion of the zero crossing detect signal, causing a dimming timer to begin counting;
(b) when the dimming timer reaches a given value, asserting the gate drive signal;
(c) deasserting the gate drive signal when the dimming timer reaches a second given value or stop counting of the dimming timer when the dimming timer reaches an automatic reset value, whichever occurs first;
(d) resetting the dimming timer to zero without causing the dimming timer to again begin counting; and
(e) when the zero crossing detect signal is again asserted, returning to (a).

16. The circuit of claim 15, wherein the operation of the power factor correction circuit in the discontinuous mode if the user desired brightness level is below the threshold brightness enables light emission by the string of LEDs that does not irritate a human eye via flicker.

17. The circuit of claim 15, wherein the operation of the power factor correction circuit in the discontinuous mode if the user desired brightness level is below the threshold brightness enables light emission by the string of LEDs at the user desired brightness level of 5% but that does not irritate a human eye via flicker.

18. A circuit, comprising:
a power factor correction circuit configured to receive a rectified mains voltage and provide output to a DC voltage bus;
a voltage converter configured to receive input from the DC voltage bus and provide output configured to drive a string of light emitting diodes (LEDs); and
a microcontroller configured to:
receive a plurality of digital feedback signals from the voltage converter;
control the voltage converter based upon a user desired brightness level and the plurality of digital feedback signals; and
receive a plurality of feedback signals from the power factor correction circuit, and based thereupon:
operate the power factor correction circuit in transition mode if the user desired brightness level is above a threshold brightness, and
operate the power factor correction circuit in discontinuous mode if the user desired brightness level is below the threshold brightness;
wherein the voltage converter comprises:
a diode coupled between a first node and the DC voltage bus;
a power transistor coupled between the first node and a second node;
a sense resistor coupled between the second node and ground;
a voltage divider coupled between the first node and ground;
an inductor coupled between the first node and a third node; and
a filter coupled between the second node and a fourth node;
wherein an inverse buck zero cross detect signal is generated at a tap of the filter;
wherein an inverse buck current peak comparison signal is generated at the second node;
wherein an inverse buck current sense signal is generated at an output of the filter;
wherein the string of LEDs is coupled between the third node and the DC voltage bus; and
wherein the plurality of digital feedback signals comprise the inverse buck zero cross detect signal, the inverse buck current peak comparison signal, and the inverse buck current sense signal.

19. The circuit of claim 18, further comprising a first diode coupled between the tap of the voltage divider and a voltage reference, and a second diode coupled between the tap of the voltage divider and ground.

20. The circuit of claim 18, further comprising a gate driver configured to receive as input an inverse buck drive enable signal and an inverse buck gate drive signal from the microcontroller, and bias the power transistor based thereupon.

21. The circuit of claim 18, wherein the operation of the power factor correction circuit in the discontinuous mode if the user desired brightness level is below the threshold brightness enables light emission by the string of LEDs that does not irritate a human eye via flicker.

22. The circuit of claim 18, wherein the operation of the power factor correction circuit in the discontinuous mode if the user desired brightness level is below the threshold brightness enables light emission by the string of LEDs at the user desired brightness level of 5% but that does not irritate a human eye via flicker.

23. A circuit, comprising:
a power factor correction circuit configured to receive a rectified mains voltage and provide output to a DC voltage bus, wherein the power factor correction circuit is configured to generate a plurality of feedback signals, wherein the plurality of feedback signals comprise an input sense signal that is a function of the rectified mains voltage as drawn by the power factor correction circuit, an output sense signal that is a function of an output provided to the DC voltage bus, a zero crossing detect signal that is a function of zero crossings of an inductor current in the power factor correction circuit, and a peak current detect signal generated based upon instances of the inductor current exceeding a threshold current;
wherein the power factor correction circuit comprises:
an input node configured to receive the rectified mains voltage;
a transformer having a first winding coupled between the input node and a first node;
a diode coupled between the first node and the DC voltage bus;
a first voltage divider coupled between the DC voltage bus and ground, a tap of the first voltage divider providing the output sense signal;
wherein the transformer has a second winding coupled between a second node and ground, the second winding being electromagnetically coupled to the first winding;
a filter coupled between the second node and a third node;

a comparator having a first input coupled to the third node, a second input coupled to a reference voltage, and an output providing the zero crossing detect signal;

a second voltage divider coupled between the input node and ground, wherein a tap of the second voltage divider provides the input sense signal; and a peak current detect signal generation circuit coupled to receive input from the first node;

a voltage converter configured to receive input from the DC voltage bus and provide output configured to drive a string of light emitting diodes (LEDs);

a microcontroller configured to:
receive a plurality of digital feedback signals from the voltage converter;
control the voltage converter based upon a user desired brightness level and the plurality of digital feedback signals to output a DC signal to drive the string of LEDs using analog dimming; and
receive a plurality of feedback signals from the power factor correction circuit, and based thereupon:
operate the power factor correction circuit in transition mode if the user desired brightness level is above a threshold brightness, and
operate the power factor correction circuit in discontinuous mode if the user desired brightness level is below the threshold brightness.

24. The circuit of claim 23, further comprising a user console configured to accept user input of the user desired brightness level and output an analog user desired brightness level; and wherein the microcontroller is further configured to digitize the analog user desired brightness level.

25. The circuit of claim 23, further comprising a user console configured to accept user input of the user desired brightness level and output the user desired brightness level in digital form.

26. The circuit of claim 23, wherein the peak current detect signal generation circuit comprises:
a gate driver configured to receive as input a power factor correction gate drive signal from the microcontroller, and provide a control signal output;
a transistor coupled between the first node and a fourth node, the transistor biased by the control signal output; and
a comparator having a first input coupled to the fourth node, a second input coupled to receive a second reference voltage, and an output generating the peak current detect signal.

27. The circuit of claim 26, wherein the microcontroller is further configured to:
receive temperature feedback indicating an operating temperature;
if the plurality of feedback signals from the power factor correction circuit indicate that an output voltage of the power factor correction circuit is below a threshold voltage, generate the power factor correction gate drive signal so as to increase a pulse width of the control signal output;
if the plurality of feedback signals from the power factor correction circuit indicate that the output voltage of the power factor correction circuit is above the threshold voltage, generate the power factor correction gate drive signal so as to decrease a pulse width of the control signal output;
if an input voltage to the power factor correction circuit is not within a desired operating range, halt operation of the circuit;

if the temperature feedback indicates that the operating temperature is not within a desired temperature range, halt operation of the circuit; and if the temperature feedback indicates that the operating temperature is within the desired temperature range, adjust the power factor correction gate drive signal based upon a load current drawn by the string of LEDs.

28. A circuit, comprising:
a power factor correction circuit configured to receive a rectified mains voltage and provide output to a DC voltage bus, wherein the power factor correction circuit is configured to generate a plurality of feedback signals, wherein the plurality of feedback signals comprise an input sense signal that is a function of the rectified mains voltage as drawn by the power factor correction circuit, an output sense signal that is a function of the output provided to the DC voltage bus, a zero crossing detect signal that is a function of zero crossings of an inductor current in the power factor correction circuit, and a peak current detect signal generated based upon instances of the inductor current exceeding a threshold current;
wherein the power factor correction circuit comprises:
an input node configured to receive the rectified mains voltage;
a transformer having a first winding coupled between the input node and a first node;
a diode coupled between the first node and the DC voltage bus;
a first voltage divider coupled between the DC voltage bus and ground, a tap of the first voltage divider providing the output sense signal;
wherein the transformer has a second winding coupled between a second node and ground, the second winding being electromagnetically coupled to the first winding;
a filter coupled between the second node and a third node;
a comparator having a first input coupled to the third node, a second input coupled to a reference voltage, and an output providing the zero crossing detect signal;
a second voltage divider coupled between the input node and ground, wherein a tap of the second voltage divider provides the input sense signal; and
a peak current detect signal generation circuit coupled to receive input from the first node;
a voltage converter configured to receive input from the DC voltage bus and provide output configured to drive a string of light emitting diodes (LEDs);
a microcontroller configured to
receive a plurality of digital feedback signals from the voltage converter;
control the voltage converter based upon a user desired brightness level and the plurality of digital feedback signals to output a pulsed signal to drive the string of LEDs using digital dimming; and
receive the plurality of feedback signals from the power factor correction circuit, and based thereupon,
operate the power factor correction circuit in transition mode if the user desired brightness level is above a threshold brightness, and
operate the power factor correction circuit in discontinuous mode if the user desired brightness level is below the threshold brightness.

29. The circuit of claim 28, further comprising a user console configured to accept user input of the user desired brightness level and output an analog user desired brightness level; and wherein the microcontroller is further configured to digitize the analog user desired brightness level.

30. The circuit of claim 28, further comprising a user console configured to accept user input of the user desired brightness level and output the user desired brightness level in digital form.

31. The circuit of claim 28, wherein the peak current detect signal generation circuit comprises:
   a gate driver configured to receive as input a power factor correction gate drive signal from the microcontroller, and provide a control signal output;
   a transistor coupled between the first node and a fourth node, the transistor biased by the control signal output; and
   a comparator having a first input coupled to the fourth node, a second input coupled to receive a second reference voltage, and an output generating the peak current detect signal.

32. The circuit of claim 31, wherein the microcontroller is further configured to:
   receive temperature feedback indicating an operating temperature;
   if the plurality of feedback signals from the power factor correction circuit indicate that an output voltage of the power factor correction circuit is below a threshold voltage, generate the power factor correction gate drive signal so as to increase a pulse width of the control signal output;
   if the plurality of feedback signals from the power factor correction circuit indicate that the output voltage of the power factor correction circuit is above the threshold voltage, generate the power factor correction gate drive signal so as to decrease the pulse width of the control signal output;
   if an input voltage to the power factor correction circuit is not within a desired operating range, halt operation of the circuit;
   if the temperature feedback indicates that the operating temperature is not within a desired temperature range, halt operation of the circuit; and
   if the temperature feedback indicates that the operating temperature is within the desired temperature range, adjust the power factor correction gate drive signal based upon a load current drawn by the string of LEDs.

\* \* \* \* \*